Sept. 14, 1954  L. E. WALKUP ET AL  2,689,179
XEROGRAPHIC CONTACT COPYING DEVICE
Filed March 2, 1951  2 Sheets-Sheet 1
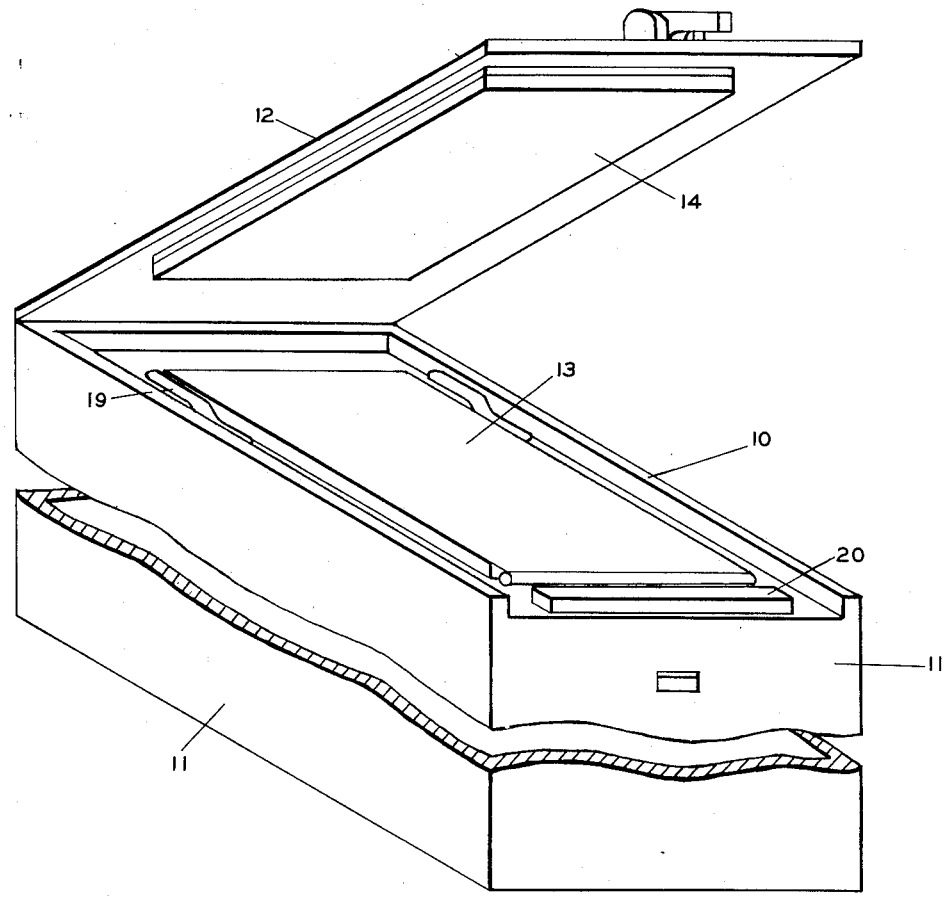
FIG. 1
FIG. 3
INVENTORS
LEWIS E. WALKUP
HAROLD E. COPLEY
BY 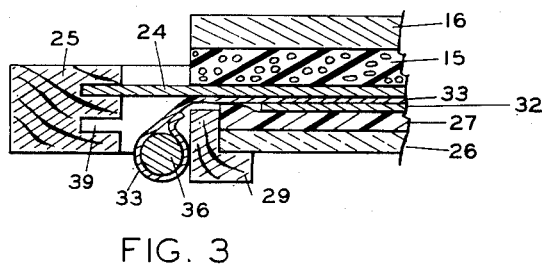
ATTORNEYS Sept. 14, 1954  L. E. WALKUP ET AL  2,689,179
XEROGRAPHIC CONTACT COPYING DEVICE
Filed March 2, 1951  2 Sheets-Sheet 2

INVENTORS
LEWIS E. WALKUP
HAROLD E. COPLEY
BY Frank A. Steinhilper
and Chester F. Carlson
ATTORNEYS Patented Sept. 14, 1954

2,689,179

UNITED STATES PATENT OFFICE 2,689,179

XEROGRAPHIC CONTACT COPYING DEVICE

Lewis E. Walkup, Columbus, Ohio, and Harold E. Copley, Elkton, Md., assignors, by mesne assignments, to The Haloid Company, Rochester, N. Y., a corporation of New York Application March 2, 1951, Serial No. 213,558

4 Claims. (Cl. 95—1.9)

This invention relates to xerography and, in particular, to a contact copying mechanism for the xerographic process.

In Carlson U. S. Patent No. 2,297,691 there is disclosed a process of electrophotography which has since become known as zerography. The process of xerography has in recent years been developed toward commercial applications in many fields, one of which is the copying of manuscripts, letters, documents and the like. The process of copying, and in particular copying by xerography, is particularly adapted to a contact copying operation for various reasons such as the fact that a copy of equal size is highly desirable and the fact that contact copying is adapted to easy operation and handling.

It is an object of this invention to provide an improved mechanism for contact copying according to the xerographic processes.

The xerographic members which have been developed and devised for the process of xerography are based around a xerographic plate consisting of a conductive backing material having a vitreous selenium layer on one surface thereof. This vitreous selenium is characterized by being extremely brittle and fragile whereby it is relatively easily cracked, chipped or the like. It is, accordingly, another object of the invention to provide xerographic copying mechanism adapted for handling the fragile xerographic plate expediently and easily and without damage or danger to the brittle selenium layer.

In addition, a contact copying method for xerography requires extremely close and firm contact between the xerographic plate and the copy to be reproduced, and it is therefore a further object of the invention to provide copying mechanism for achieving the desired close contact without damage to the delicate xerographic plate.

Additional objects of the invention will be apparent in the specification and in the drawings wherein:

Figure 1 is an isometric view of a contact exposure mechanism according to one embodiment of the invention;

Figure 3 is an enlarged fragmentary cross section of a portion of the mechanism shown in Figure 2.

Figure 2:
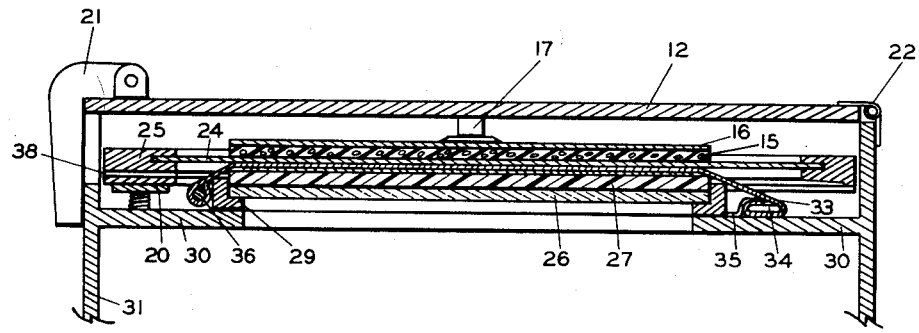
Figure 2 is a side elevation in cross section of the contact portion of the mechanism of Figure 1.

Referring to the figures in detail, there is shown in Figures 1 and 2 xerographic exposure mechanism generally designated 10 comprising a cabinet 11 having a hinged cover 12 with a transparent exposure panel 13 on the upper surface of the cabinet member. Positioned on the inside of the cover 12 is a pressure pad 14 positioned and adapted to be brought substantially into contact with the exposure panel 13 when the cover is closed upon the cabinet. This pressure pad comprises a flexible resilient layer 15 mounted upon a rigid backing plate 16 which, in turn, is secured to cover 12 through a centrally located pivot mount 17.

Adjacent to the exposure panel 13 and toward the rear of the cabinet are a plurality of spring members 19 which are adapted and positioned to receive and resiliently support a xerographic plate adjacent to the exposure panel. At the front end of the cabinet, this being the end from which the cover opens, is a resiliently mounted light seal bar 20 positioned and adapted to receive the xerographic plate and to operate to seal the lower surface of the plate from light as the cover 12 is raised. Along the front edge of the cover 12 there is mounted a handle or catch 21 adapted to secure the cover in a closed position and to release the cover so that it may be swung open on hinge 22 mounted at the opposite end thereof.

In general operation, a manuscript, document or like copy to be reproduced is placed face up on exposure panel 13 and a xerographic plate is positioned face down on top of the copy. A light shield or other protective member if employed for the xerographic plate, may then be removed after which the cover 12 is lowered into contacting position and secured there by catch 21. In this position the pressure pad 14 is in firm contact with the upper or back surface of the xerographic plate and the whole unit is pressed securely against the exposure panel 13, whereby firm contact is achieved between the xerographic plate and the copy. The assembly in this position is then exposed to the desired quantity of light, the cover then lifted and the xerographic plate processed according to the desired techniques of xerography.

In Figures 2 and 3 there are shown in detail a preferred arrangement of parts and mechanisms according to one embodiment of the invention. These figures show the exposure device in its closed position with a xerographic plate 24 mounted in a frame 25, the plate and frame being supported by the exposure panel which consists of a rigid transparent member 26, such as for example a glass plate or the like, and a flexible resilient transparent pad 27 mounted thereon. The exposure panel is suitably supported, for example, on a support frame 29 mounted on shoulder 30 integrally attached to the outside frame 31 of the exposure cabinet. As illustrated in the drawing, a suitable document 32 is positioned on the resilient pad 27 and a protective apron 33 is placed across the surface of the pad, document and the like. This protective apron comprises a relatively thin, flexible, soft, transparent member such as a thin plastic sheet, a sheet of cellophane, cellulose acetate or the like, which is secured at one end to the frame or cabinet, for example by means of a bar or plate 34 slipped under a pair of braces 35 mounted on shoulder 30. The other end of the apron 33 is optionally secured to a rigid bar 36 which lies just beyond support 29 and serves to pull the apron moderately taut across the surface of the exposure panel and to hold the apron substantially free from wrinkles.

The xerographic plate 24, mounted and pressed between the cover assembly and the exposure panel 13, has its delicate sensitized surface protected against damage by the pressure pad 27 and additionally protected against damage from the copy, document or the like by means of the protective apron 33, whereby the surface is safe from general accidental damage and, in addition, is safe from scratching which could occur from a hard or rough finished copy surface. In this position, uniform pressure against the plate is exerted by the upper assembly acting through pivot member 17 which results in firm but not excessive downward pressure across the entire area of the plate. Furthermore, a light seal is provided around the surface of the plate even when the cover is raised by means of the frame 25 of the plate which extends below the surface of the exposure frame 13 and which, by the critical front end thereof, is supported by light seal member 20 which may be a resilient member, a spring-mounted sealing member or the like.

In the preferred structure, the resilient light seal 20 and the springs 19 serve to support the front and the back members of the xerographic plate so that it is slightly raised from the surface of the exposure panel 13 unless and until the cover assembly is brought to bear thereon. In this position a light shield or other protective member may be inserted through a slit 38 in the front of the frame and run through communicating grooves 39 to seal and protect the sensitized surface of the plate against light while at the same time the xerographic plate assembly is close to the exposure panel and is in a shielded position protecting it from light. As is apparent, such a light shield may be inserted or removed while the plate is substantially in its exposure position whereby accidental exposure to light will not occur in moving the plate into its final position for exposure. For the purpose of inserting and removing the light shield or the like, it is also apparent that the protective apron 33 serves the additional purpose of protecting the exposure panel 13 and protecting the copy 32 from contact with the shield.

Figure 4:
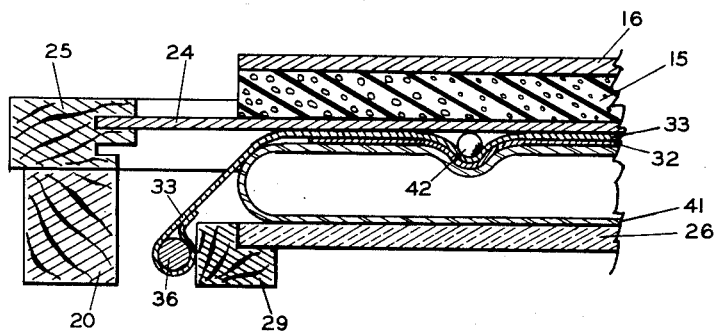
Figure 4 is a similar enlarged fragmentary cross section according to a different embodiment of the invention.

In Figure 4 there is shown a modified device and mechanism according to another embodiment of this invention. According to this figure the exposure panel comprises a rigid transparent plate 26 mounted and supported on a support member 29 and having thereover fluid-filled transparent protective pad 41. This pad consists of a flattened bag or pillow of a flexible transparent sheet material such as, for example, plastic sheet, sheet of cellophane, cellulose acetate, polystyrene, or other flexible or rubbery transparent sheet member. This pillow 41 is filled with a suitable fluid such as, for example, air or other gas substantially at atmospheric pressure or a liquid such as water, a transparent oil or other fluid. The assembly shown in Figure 4 also has the upper pressure members 15 and 16, the copy 32, the protective apron 33, and the xerographic plate and frame together with other members as shown in the preceding figures. In this figure there is also illustrated a foreign body 42 which may, for example, be a carrier particle from a powder carrier developer composition which may desirably be employed in the xerographic processing of the plate. It frequently happens, during xerographic steps other than exposure, that a particle such as a carrier particle may become loosely adherent to the plate and may by accident be introduced between the plate and the exposure panel. In the absence of the device of this invention there is a danger that such a particle will cause a slight bending or bulging in the xerographic plate with the result that the brittle selenium layer of the plate will become cracked or checked. As illustrated in Figure 4, the distorting effect of a foreign particle within the exposure mechanism will be taken up or absorbed, not by the xerographic plate but by the resilient exposure panel 13. Thus, as illustrated in the figure, the pad 41 is compressed at the point where the foreign particle 42 exists and the entire accommodation and adjustment in the mechanism is within the exposure panel and is not transmitted to the xerographic plate.

What is claimed is:

1. An exposure device for contact xerographic copying wherein a xerographic plate is held in contact with copy to be reproduced while being exposed to light, said device comprising a cabinet and a light source therein, a rigid transparent panel in a wall of the cabinet and a cover movable over said panel, a resilient, flexible, transparent pad positioned on the rigid transparent panel, and a thin, flexible, soft, transparent sheet secured to the cabinet and disposed to be drawn over the copy to be reproduced and adapted to receive a xerographic plate thereon, and a pressure plate resiliently mounted within the cover and positioned over the transparent panel to bear firmly against a xerographic plate when on the transparent sheet whereby the xerographic plate is firmly and resiliently retained in an exposure position.

2. An exposure device for contact xerographic copying wherein a xerographic plate is held in contact with copy to be reproduced while being exposed to light, said device comprising a cabinet and a light source therein, a rigid transparent panel in a wall of the cabinet and a cover movable over said panel, a resilient, flexible, transparent pad positioned on the rigid transparent panel and adapted to absorb within its body the distortion of a xerographic developer carrier particle of a size in the order of 20 to 30 mesh, and a thin, flexible, soft, transparent sheet secured to the cabinet and disposed to be drawn over the copy to be reproduced and adapted to receive a xerographic plate thereon, and a resilient pressure plate mounted within the cover and positioned over the transparent panel to bear firmly against a xerographic plate when on the transparent sheet whereby the xerographic plate is firmly and resiliently retained in an exposure position, and spring support members at the rear of the transparent panel adapted to resiliently support one end of a xerographic plate and a resilient light seal positioned across the front of the panel adapted to support the other end of a xerographic plate, said spring members and resilient light seal operating to support the plate closely above and free from the transparent panel and transparent pad and to yield under the pressure of the cover pressure plate when closed to move the plate into contact with the transparent sheet.

3. An exposure device for contact xerographic copying wherein a xerographic plate is held in contact with a copy to be reproduced while being exposed to light, composed of a cabinet and a light source therein, a rigid transparent panel in a wall of the cabinet and a cover movable over said panel, the improvement comprising a resilient, flexible, transparent pad positioned on the rigid transparent panel, and a thin, flexible, soft, transparent insulating sheet secured to the cabinet and disposed to be drawn over the copy to be reproduced and adapted to receive a xerographic plate thereon, and a resilient pressure plate mounted within the cover and positioned over the transparent panel to bear firmly against a xerographic plate when on the transparent sheet whereby the xerographic plate is firmly and resiliently retained in an exposure position.

4. An exposure device for contact xerographic copying wherein a xerographic plate is held in contact with copy to be reproduced while being exposed to light, said device comprising a cabinet and a light source therein, a rigid transparent panel in a wall of the cabinet and a cover movable over said panel, a resilient, flexible, transparent pad positioned on the rigid transparent panel and adapted to absorb within its body the distortion of a xerographic developer carrier particle of a size in the order of 20 to 30 mesh, and a thin, flexible, soft, transparent insulating sheet secured to the cabinet and disposed to be drawn over the copy to be reproduced whereby the xerographic plate is insulated from the copy to be reproduced, and adapted to receive a xerographic plate thereon, and a resilient pressure plate mounted within the cover and positioned over the transparent panel to bear firmly against a xerographic plate when on the transparent sheet whereby the xerographic plate is firmly and resiliently retained in an exposure position.

References Cited in the file of this patent

UNITED STATES PATENTS

| Number | Name | Date |
|---|---|---|
| 2,254,717 | Weiss | Sept. 2, 1941 |
| 2,365,225 | Stiffler | Dec. 19, 1944 |
| 2,463,093 | Felder | Mar. 1, 1949 |
| 2,557,097 | Goldschein | June 19, 1951 |

FOREIGN PATENTS

| Number | Country | Date |
|---|---|---|
| 640,820 | Great Britain | July 26, 1950 |